United States Patent
Steedman et al.

(10) Patent No.: US 10,318,457 B2
(45) Date of Patent: Jun. 11, 2019

(54) METHOD AND APPARATUS FOR SPLIT BURST BANDWIDTH ARBITRATION

(71) Applicant: Microchip Technology Incorporated, Chandler, AZ (US)

(72) Inventors: Sean Steedman, Phoenix, AZ (US); Yong Yuenyongsgool, Gilbert, AZ (US); Jacobus Albertus van Eeden, Chandler, AZ (US); David Otten, Chandler, AZ (US); Naveen Raj, Chandler, AZ (US); Prashanth Pulipaka, Bangalore (IN); Prasanna Surakanti, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 121 days.

(21) Appl. No.: 15/169,352

(22) Filed: May 31, 2016

(65) Prior Publication Data

US 2016/0350246 A1    Dec. 1, 2016

Related U.S. Application Data

(60) Provisional application No. 62/169,354, filed on Jun. 1, 2015.

(51) Int. Cl.
*G06F 13/30* (2006.01)
*G06F 13/37* (2006.01)
*G06F 13/28* (2006.01)

(52) U.S. Cl.
CPC .............. *G06F 13/30* (2013.01); *G06F 13/28* (2013.01); *G06F 13/37* (2013.01)

(58) Field of Classification Search
None
See application file for complete search history.

(56) References Cited

U.S. PATENT DOCUMENTS

| | | | | |
|---|---|---|---|---|
| 5,371,517 A | * | 12/1994 | Izzi ....................... | G06F 11/006 345/589 |
| 7,877,524 B1 | * | 1/2011 | Annem .................. | G06F 13/28 710/22 |
| 8,812,898 B1 | * | 8/2014 | Lahon .................... | G06F 11/10 714/4.2 |
| 8,880,756 B1 | | 11/2014 | Birsan et al. .......... | 710/22 |

(Continued)

FOREIGN PATENT DOCUMENTS

WO    02/48891 A2    6/2002    ............. G06F 13/16

OTHER PUBLICATIONS

International Search Report and Written Opinion, Application No. PCT/US2016/035156, 13 pages, dated Aug. 17, 2016.

*Primary Examiner* — Henry Tsai
*Assistant Examiner* — John B Roche
(74) *Attorney, Agent, or Firm* — Slayden Grubert Beard PLLC

(57) ABSTRACT

An embedded system and method for controlling such are disclosed. The embedded system includes a direct memory controller comprising a plurality of channels, wherein a plurality of channel arbitration schemes are programmable, wherein the DMA controller is programmable to split a block data transfer on a specified channel into a plurality of separate data transfers, wherein a data transfer on a specified channel can be interrupted between separate data transfers of the data transfer.

21 Claims, 3 Drawing Sheets

(56) References Cited

U.S. PATENT DOCUMENTS

2008/0049541 A1* 2/2008 Fujisawa .............. G11C 7/1018
365/233.18
2010/0053223 A1* 3/2010 Otsuka ................. G09G 3/2022
345/690

* cited by examiner

METHOD AND APPARATUS FOR SPLIT BURST BANDWIDTH ARBITRATION

CROSS-REFERENCE TO RELATED APPLICATIONS

This application claims priority to commonly owned U.S. Provisional Patent Application No. 62/169,354 filed Jun. 1, 2015, which is hereby incorporated by reference herein for all purposes.

TECHNICAL FIELD

The present disclosure relates to a method and apparatus for split burst bandwidth arbitration in particular in direct memory access (DMA) controllers.

BACKGROUND

Many embedded systems, such as microcontrollers, comprise a DMA controller that allows for an efficient and fast data transfer over the internal system bus of the microcontroller. A bus, in particular a system bus in an embedded system, generally allows various components of the embedded system to communicate. DMA controllers often provide for a so-called burst operations that provide for a large data transfers at high speed. However, such burst operations may block the entire bus and other components that require access will not be able to access the bus until the burst transfer has been completed. Thus, additional measures to keep account of the request and status of the pending transactions are required.

SUMMARY

There exists a need to prevent a low priority agent to occupy the bus for an extended period of time in burst operation. By splitting the burst operation into transactions, the bus bandwidth can be shared among other modules.

An embedded system and method for controlling such are disclosed. The embedded system includes a direct memory controller comprising a plurality of channels, wherein a plurality of channel arbitration schemes are programmable, wherein the DMA controller is programmable to split a block data transfer on a specified channel into a plurality of separate data transfers, wherein a data transfer on a specified channel can be interrupted between separate data transfers of the data transfer.

According to various embodiments, an embedded system is disclosed. The embedded system may include a direct memory controller comprising a plurality of channels, wherein a plurality of channel arbitration schemes are programmable, wherein the DMA controller is programmable to split a block data transfer on a specified channel into a plurality of separate data transfers, wherein a data transfer on a specified channel can be interrupted between separate data transfers of the data transfer.

In some embodiments, the arbitration schemes includes a round-robin scheme and a fixed priority scheme. In other embodiments, the arbitration schemes includes a round-robin scheme and an assignable priority scheme. In some embodiments, a block data transfer may be split into the plurality of separate data transfers upon setting of a bit in a control register.

In some embodiments, a separate data transfers may include a programmable maximum of data bytes. In such embodiments, the programmable maximum is a value stored in a control register.

In some embodiments, a separate data transfers may include a fixed number of data bytes. In such embodiments, the fixed number of data bytes may be one byte.

In various embodiments, a method for operating an embedded system is disclosed. The method may include operating a direct memory controller comprising a plurality of channels, wherein a plurality of channel arbitration schemes are programmable, and programming the DMA controller to split a block data transfer on a specified channel into a plurality of separate data transfers, wherein a data transfer on a specified channel can be interrupted between separate data transfers of the data transfer.

In some embodiments of the method, the arbitration schemes may include a round-robin scheme and a fixed priority scheme. In other embodiments, the arbitration schemes may include a round-robin scheme and a assignable priority scheme.

In some embodiments of the method a block data transfer may be split into the plurality of separate data transfers upon setting of a bit in a control register. In the same or alternative embodiments, a separate data transfers may include a programmable maximum of data bytes. In such embodiments, the programmable maximum is a value stored in a control register.

In some embodiments of the method, a separate data transfers may include a fixed number of data bytes. In such embodiments, the fixed number of data bytes may be one byte.

DETAILED DESCRIPTION

There exists a need to prevent a low priority agent to occupy the bus for an extended period of time in burst operation. By splitting the burst operation into transactions, the bus bandwidth can be shared among other modules.

Figure 1:
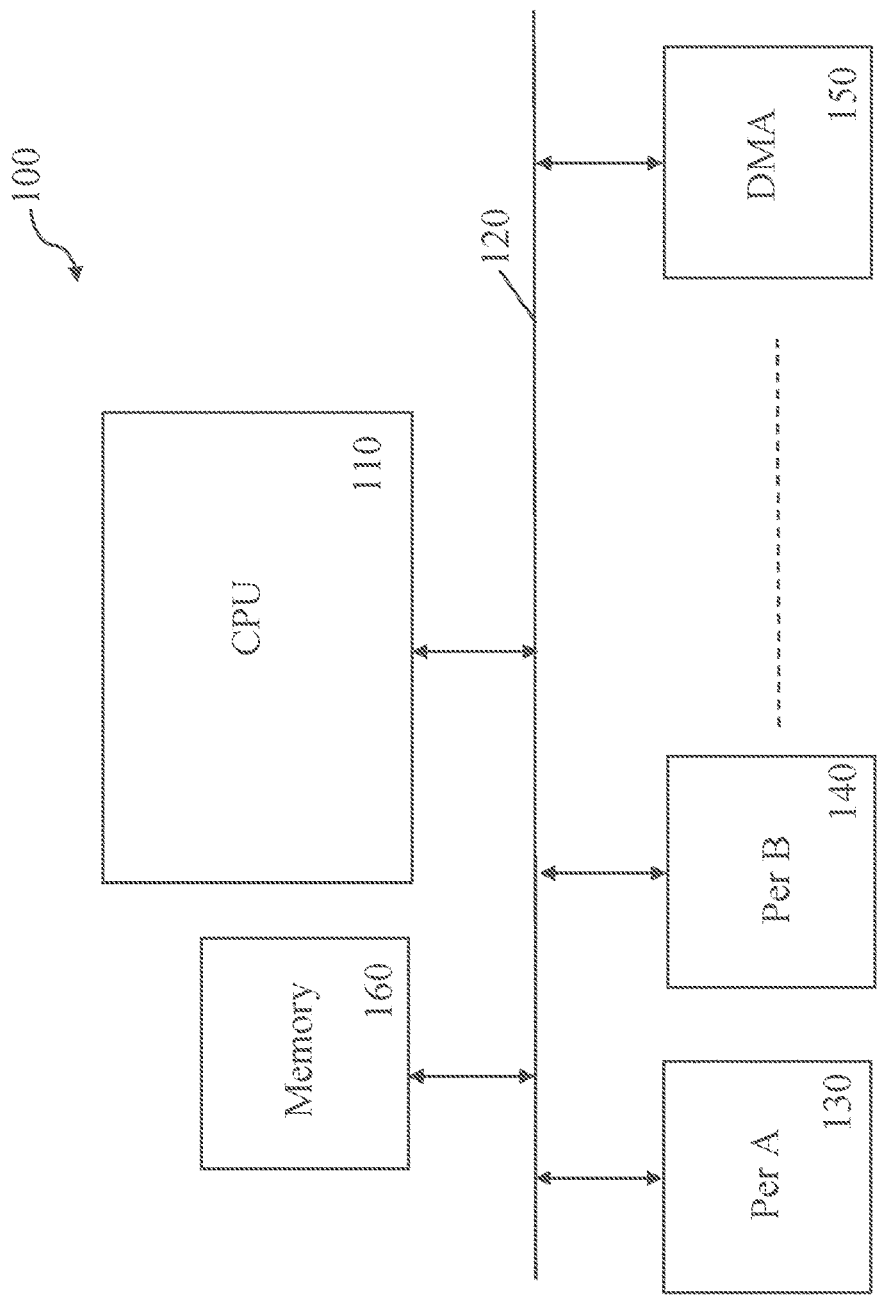
FIG. 1 shows a typical embedded system, such as a microcontroller including a central processing unit coupled with an internal system bus which connects the various peripheral devices of the microcontroller, in accordance with certain embodiments of the present disclosure.

FIG. 1 shows a typical embedded system 100, such as a microcontroller including a central processing unit (CPU) 110 coupled with an internal system bus 120 which connects the various peripheral devices 130-150 of the microcontroller, in accordance with certain embodiments of the present disclosure. One of the peripheral devices can be a direct memory access controller ("DMA" or "controller") 150 that allows data transfers between the peripherals 130, 140, etc. and memory 160 or within the memory 160. An embedded DMA controller 150 provides for a plurality of transmission channels, for example 16 channels, wherein each channel may have an assignable or fixed channel priority or the controller 150 may use a round-robin assignment. Each channel operation may be triggered by a respective signal. If multiple selected triggers occur among multiple channels simultaneously, the DMA macro is designed to select the next channel for service, based on either the round-robin or a fixed priority scheme. Note that both schemes share the following common characteristics according to some embodiments:

In some embodiments, for each trigger, all associated transactions must be completed. For a "one-shot" transfer mode, the next channel may be serviced while the current channel is waiting for the next trigger. For a "continuous" modes, the next channel will only get serviced when the current channel's counter (e.g., "CNT[15:0]") is decremented to zero. In the same or alternative embodiments, both read and write transaction combinations must be completed before servicing another channel to avoid data ordering issues.

In some embodiments, grant determination is evaluated for every instruction cycle. The process starts with determining the requesting channel that currently has the highest priority based on a set scheme. Then the grant is given only when the bus bandwidth of the winning DMA channel is available. If the bandwidth of the particular bus being requested by the winning DMA channel is unavailable, the process is repeated in the next instruction cycle.

Figure 2:
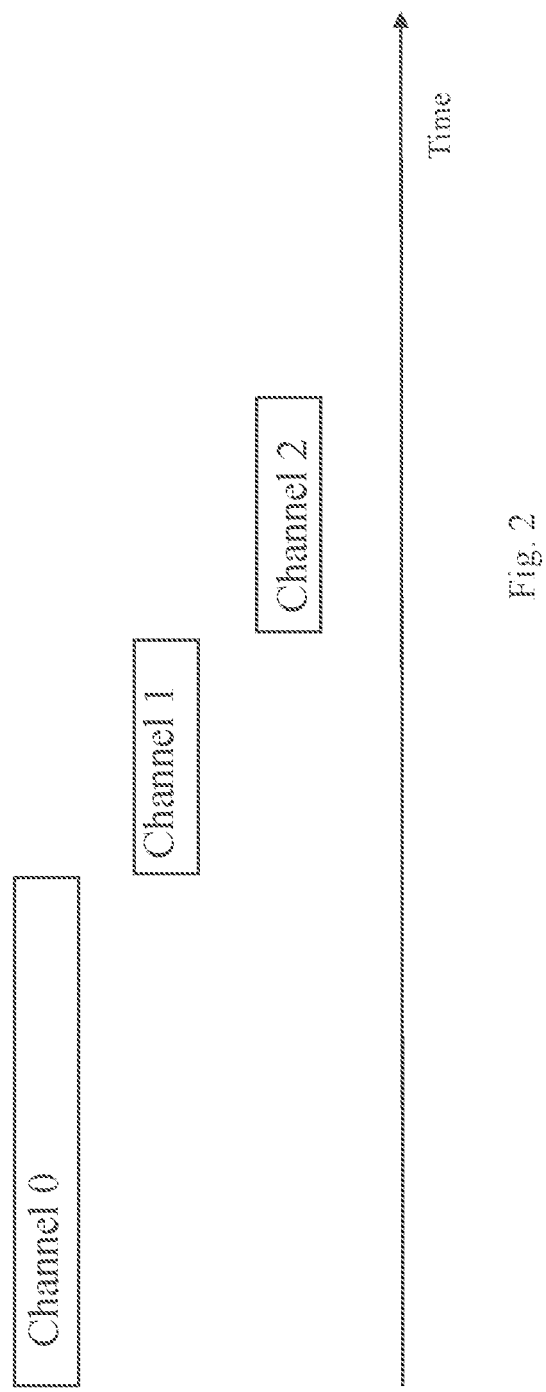
FIG. 2 illustrates an example typical data transfer of three channels according to this scheme, in accordance with certain embodiments of the present disclosure.

In some embodiments, a "round robin" priority scheme may be used. In such a scheme, priority may be used (for example) at least when a priority bit is set in a control register. For example, when the DMACON.PRIORITY bit in a respective control register is set low, a round-robin priority scheme is employed in selecting the next DMA channel for service. For example, if the scheme begins with channel 0, the next channel to be selected is the channel with the lowest channel number down the round. For example, if channels 0, 1, and 2 are triggered simultaneously, channel 0 will be scheduled for service first, then channel 1 and channel 2 are serviced, respectively. Table 1 below illustrates this example default setting. FIG. 2 illustrates an example typical data transfer of three channels according to this scheme, in accordance with certain embodiments of the present disclosure.

TABLE 1

| CH0 req | CH1 req | CH2 req | CH3 req | CH granted |
|---------|---------|---------|---------|------------|
| —       | —       | —       | —       | none       |
| —       | yes     | —       | —       | CH1        |
| yes     | yes     | yes     | —       | CH2        |
| yes     | yes     | —       | —       | CH0        |
| yes     | yes     | —       | —       | CH1        |
| yes     | yes     | —       | yes     | CH3        |
| yes     | yes     | —       | —       | CH0        |

In some configurations however, if channel 0 is triggered again at any time thereafter, it will be serviced first only at the start of the next round. Even if channel 1 is triggered again after having been serviced before channel 0 is triggered the second time, channel 1 will be serviced after channel 0 at the second round.

In some embodiments, a "fixed" priority scheme may be used. In such a scheme, priority may be used (for example) at least when a priority bit is set in a control register. For example, when the DMACON.PRIORITY bit is set high in a respective control register, the priority scheme is fixed based on the channel number. For example, starting with channel 0, the next channel to be selected is the channel with the lowest channel priority regardless of what has transpired before. For example, if channel 0, 1, and 2 are triggered simultaneously, channel 0 will be scheduled for service first, followed by channel 1 and channel 2, respectively. If channel 0 is triggered again, it will be scheduled for service once the current iteration (made up of one or more transactions) is completed. Table 2 below illustrates an example setting for such a scheme.

TABLE 2

| CH0 req | CH1 req | CH2 req | CH3 req | CH granted |
|---------|---------|---------|---------|------------|
| —       | —       | —       | —       | none       |
| —       | yes     | —       | —       | CH1        |
| yes     | yes     | yes     | —       | CH0        |
| yes     | yes     | —       | —       | CH0        |
| —       | yes     | —       | —       | CH1        |
| —       | yes     | —       | yes     | CH1        |
| —       | —       | —       | yes     | CH3        |

In many systems, multiple DMA channels are found. Certain arbitration schemes typically use fixed priorities and bus access may typically be granted for an entire transfer which cannot be interrupted as shown in FIG. 2. These type of schemes allow long running low priority transfers to delay the servicing of high priority requests significantly.

Figure 3:
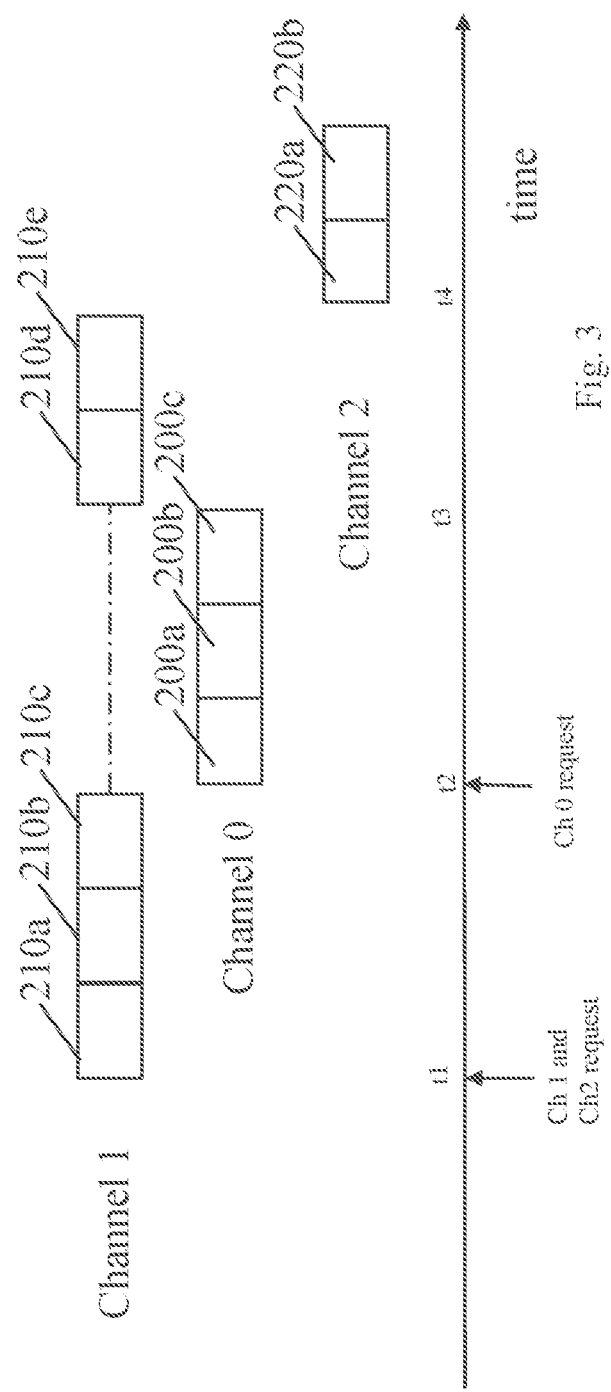
FIG. 3 shows an example in which the transfer for channel 1 is broken into a number of sub-transactions, in accordance with certain embodiments of the present disclosure

According to various embodiments, the channel state is maintained which makes transfers interruptible and makes transfers resumable. Furthermore, a transfer is broken into a number of sub-transactions (e.g., at byte level) which may allow as many arbitration opportunities as possible. FIG. 3 shows an example in which the transfer for channel 1 is broken into a number of sub-transactions 210a, 210b, 210c, 210d, and 210e, in accordance with certain embodiments of the present disclosure. Similarly, the transfer on channel 0 is broken into sub-transactions 200a, 200b, and 200c. A transfer on channel 2 is broken into sub-transactions 220a and 220b. Various arbitration schemes can be implemented, and they can be applied per transaction rather than per-transfer, which may allow the splitting of a low priority burst transfer by a higher priority transfer. The example in FIG. 3 illustrates the referenced sub-transactions in a fixed priority scheme similar to that describe above with reference to FIG. 2. Assuming channel 1 and channel 2 request a transfer at a first time t1, due to the higher priority the transfer of channel 1 starts first. However, the transfer may be broken into the interruptible sub-transactions 210a-e. Thus, when channel 0 requests a transfer at time t2, the channel 0 transfer will be interrupted and will resume at time t3. At time t4, channel 2 requests a transfer which will be granted because no higher priority transfer is pending.

The various embodiments provide for the following advantages: Embedded systems have different usage profiles from other computers. In embedded systems latency is a more likely critical system characteristic instead of throughput. Systems will be able to meet minimum reaction times orders of magnitude better than currently possible. This increases the problem domain serviceable with 8-bit microcontrollers.

What is claimed is:

1. An embedded system comprising a direct memory (DMA) controller comprising:
   a plurality of channels, wherein a plurality of channel arbitration schemes are programmable, and wherein:
   the DMA controller is programmable to split a block data transfer on a specified channel into a plurality of separate data transfers;
   a given data transfer on the specified channel can be interrupted between separate data transfers of the block data transfer on the specified channel; and the DMA controller is further programmable to interrupt the given data transfer for higher priority data to be transmitted on the specified channel.

2. The embedded system according to claim 1, wherein the arbitration schemes comprise a round-robin scheme.

3. The embedded system according to claim 1, wherein the arbitration schemes comprise a fixed priority scheme.

4. The embedded system according to claim 1, wherein the arbitration schemes comprise an assignable priority scheme.

5. The embedded system according to claim 1, wherein a block data transfer is split into the plurality of separate data transfers upon a setting of a bit in a control register.

6. The embedded system according to claim 1, wherein a separate data transfer comprises a programmable maximum of data bytes.

7. The embedded system according to claim 6, wherein the programmable maximum of data bytes is a value stored in a control register.

8. The embedded system according to claim 1, wherein a separate data transfer comprises a fixed number of data bytes.

9. The embedded system according to claim 8, wherein the fixed number of data bytes is one byte.

10. A method for operating an embedded system, the method comprising:
    operating a direct memory (DMA) controller comprising a plurality of channels, wherein a plurality of channel arbitration schemes are programmable; and
    programming the DMA controller to:
        split a block data transfer on a specified channel into a plurality of separate data transfers, wherein a given data transfer on the specified channel can be interrupted between separate data transfers of the block data transfer on the specified channel; and
        interrupt the given data transfer for higher priority data to be transmitted on the specified channel.

11. The method according to claim 10, wherein the arbitration schemes comprise a round-robin scheme.

12. The method according to claim 10, wherein the arbitration schemes comprise a fixed priority scheme.

13. The method according to claim 10, wherein the arbitration schemes comprise an assignable priority scheme.

14. The method according to claim 10, wherein a block data transfer is split into the plurality of separate data transfers upon a setting of a bit in a control register.

15. The method according to claim 10, wherein a separate data transfer comprises a programmable maximum of data bytes.

16. The method according to claim 15, wherein the programmable maximum of data bytes is a value stored in a control register.

17. The method according to claim 10, wherein a separate data transfer comprises a fixed number of data bytes.

18. The method according to claim 17, wherein the fixed number of data bytes is one byte.

19. An embedded system comprising: a direct memory (DMA) controller comprising a plurality of channels, wherein a plurality of channel arbitration schemes are programmable;
    wherein:
        the DMA controller is programmable to split a block data transfer on a specified channel into a plurality of separate data transfers;
        a given data transfer on the specified channel can be interrupted between separate data transfers of the block data transfer on the specified channel; a block data transfer is split into the plurality of separate data transfers upon setting of a bit in a control register;
        a separate data transfer comprises a fixed number of data bytes; and
        the DMA controller is further programmable to interrupt the given data transfer for higher priority data to be transmitted on the specified channel.

20. The embedded system according to claim 19, wherein at least one of the arbitration schemes is selected from the group consisting of: a round-robin scheme, a fixed priority scheme, and an assignable priority scheme.

21. The embedded system of claim 19, wherein the DMA controller is further programmable to interrupt the given data transfer dynamically after the given data transfer has already been initiated on the specified channel.

* * * * *